United States Patent [19]

Paluszek

[11] Patent Number: 5,047,945

[45] Date of Patent: Sep. 10, 1991

[54] RESIDUAL MAGNETIC DIPOLE CANCELLATION SYSTEM FOR SATELLITES

[75] Inventor: Michael A. Paluszek, Lawrenceville, N.J.

[73] Assignee: General Electric Company, East Windsor, N.J.

[21] Appl. No.: 564,994

[22] Filed: Aug. 9, 1990

[51] Int. Cl.⁵ .............................................. B64G 1/10
[52] U.S. Cl. .................................. 364/434; 364/459; 244/166
[58] Field of Search ..................... 364/434, 453, 459; 244/164, 166, 170, 171

[56] References Cited

U.S. PATENT DOCUMENTS 4,084,773  4/1978  Schmidt, Jr. et al. .............. 364/434
4,114,841  9/1978  Muhfelder et al. ................. 364/453

*Primary Examiner*—Salvatore Cangialosi
*Attorney, Agent, or Firm*—William H. Meise

[57] ABSTRACT

The magnitude and direction of the residual magnetic field or dipole of an orbiting spacecraft is estimated from the attitude-perturbing effects of its interaction with the magnetic field of the heavenly body about which it orbits. The measurements are performed over a significant portion of an orbit. The estimate uses h, the total spacecraft momentum in the body frame, and its body angular rate $\omega$. The Earth's magnetic flux density B is determined either by magnetometer measurements, or by recourse to stored historical and ephemeris information.

15 Claims, 4 Drawing Sheets

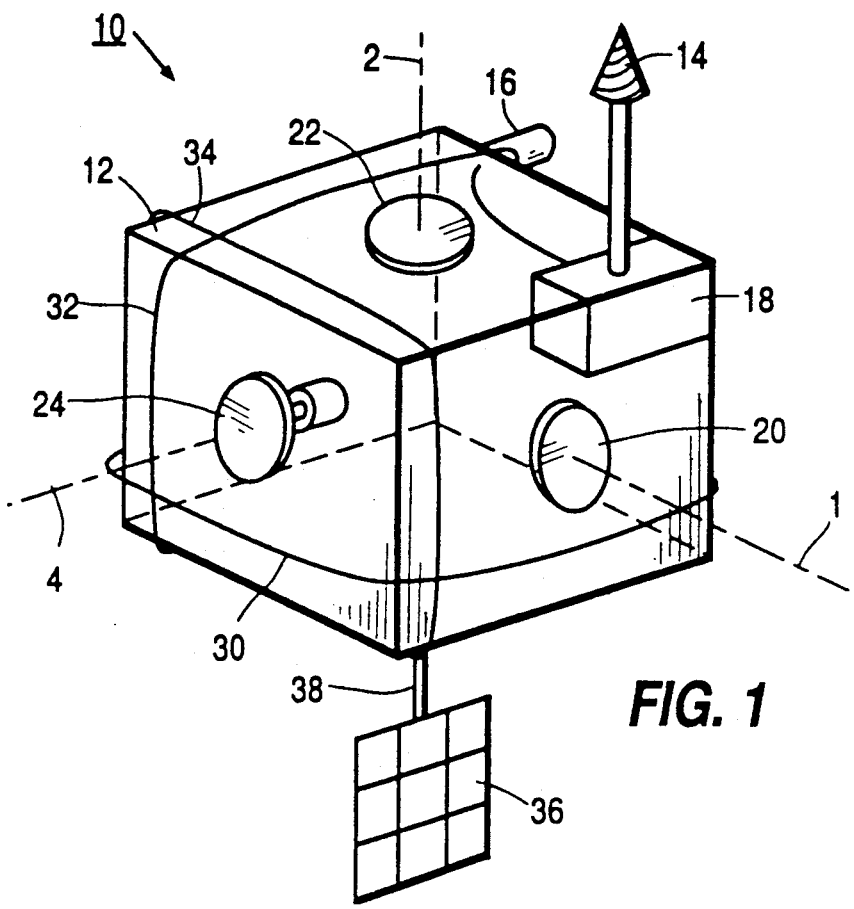
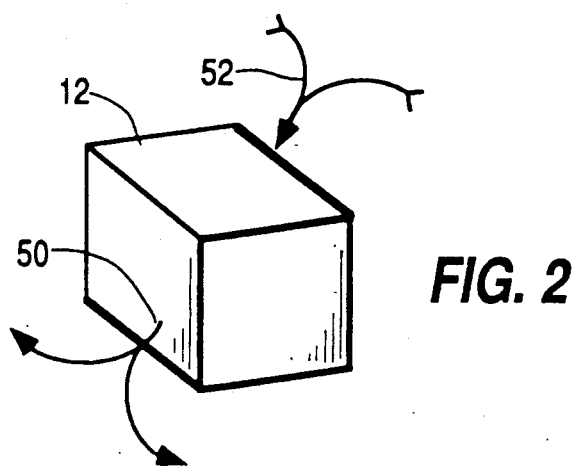
FIG. 1
FIG. 2

RESIDUAL MAGNETIC DIPOLE CANCELLATION SYSTEM FOR SATELLITES

The Government has rights in this invention pursuant to contract F04701-88-C-0047 with the Department of the Air Force.

BACKGROUND OF THE INVENTION

Earth satellites are widely used for a variety of communication, surveillance, and broadcasting use, and for navigational aid. Certain of these uses require spacecraft attitude stability. For example, a communication or surveillance satellite may be required to point an antenna or camera at a specific location on the Earth's surface. Such pointing is facilitated if the attitude of the spacecraft is well controlled.

Attitude control systems are well known in the art. Such control systems may sense attitude by the use of horizon sensors, sun sensors and the like. An attitude control system using a polar star sensor is described in U.S. patent application Ser. No. 07/511,169 filed Apr. 19, 1990 in the name of Paluszek. Such attitude control system determine the difference between the current attitude and the desired attitude of the spacecraft, and operate torquers for torquing the spacecraft toward the desired attitude. The torquers may include chemical thrusters, momentum or reaction wheels, and/or magnetic coils.

In general, it is desirable for the spacecraft to maintain the desired attitude without resort to the operation of the torquers. The operation of chemical-fuel torquers reduces the available supply of fuel which may be otherwise used for North-South stationkeeping. Momentum or reaction wheels may gradually increase their momenta, eventually requiring the use of chemical or other torquers to reduce the momenta. In any case, the wheel-type torquers and magnetic coils use electrical power, which may be in short supply. In order to reduce the interaction of spacecraft with the Earth's magnetic field, a known technique demagnetizes the spacecraft by probing its fields with magnetic sensors during manufacture for sensing magnetized regions, followed by the application of small magnets to the structure to counteract inherent magnetic fields. Many such small magnets may be used, the weight of which may undesirably reduce the payload of the spacecraft. Even if the weight should be small, it is difficult to demagnetize the spacecraft in this manner, and the magnetic characteristics of the spacecraft may in any case change following manufacture, due to the effects of transporting the satellite into its desired orbit.

A method for reducing the residual magnetic dipole of a spacecraft in orbit can reduce the attitude errors occasioned by passage of the spacecraft through Earth's varying magnetic field, thereby increasing the pointing accuracy and decreasing the need to operate torquers to maintain proper attitude.

SUMMARY OF THE INVENTION

A method for reducing attitude perturbations attributable to the interaction of magnetic fields of a heavenly body with those of a spacecraft which orbits thereabout includes the steps of measuring the spacecraft momentum over a portion of an orbit of the spacecraft about the heavenly body, and measuring the body rate over the same portion of the orbit. Information is accessed which relates to the historic magnitude of the magnetic field of the heavenly body in the portion of the orbit, or the magnetic fields may be directly sensed. The magnitude and direction of the magnetic dipole of the spacecraft are estimated from at least the momentum, the body rate and the accessed or sensed information, to form an estimate of the magnetic dipole. Current is passed through coils associated with the spacecraft in response to the estimate for tending to cancel the perturbations.

DESCRIPTION OF THE DRAWING

FIG. 1 illustrates a spacecraft which may use a method according to the invention;

FIG. 2 illustrates the body of the spacecraft of FIG. 1 with a net magnetic dipole associated therewith at an arbitrary orientation and magnitude;

DESCRIPTION OF THE INVENTION

Figure 3:
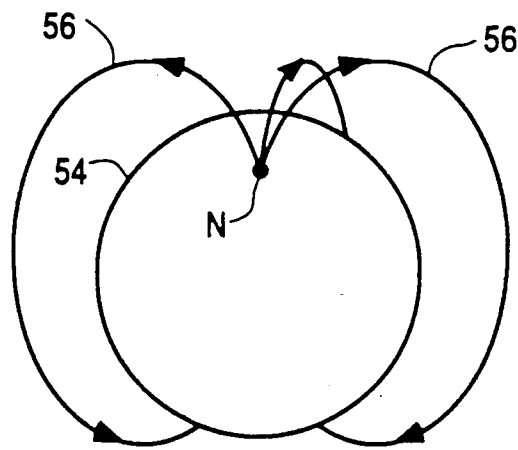
FIG. 3 illustrates the general form of the Earth's magnetic fields.

FIG. 1 illustrates a satellite designated generally as 10 including a body 12, with a low-gain communication antenna 14 mounted thereon, for receiving commands from a ground station and for transmitting status information thereto. Attitude sensors illustrated as 16 are connected, together with antenna 14, to a control circuit illustrated as a block 18. Momentum or reaction wheels 20, 22 and 24 are oriented with their axes parallel with roll, pitch and yaw axes 1, 2 and 4, respectively. Wheels 20, 22 and 24 are controlled by controller 18 to maintain a desired spacecraft attitude. A plurality of magnetic windings illustrated as 30, 32 and 34 are oriented about body 12 of spacecraft 10 for being energized with electric current under the control of controller 18 to thereby create magnetic fields about the spacecraft. A solar panel 36 supported on a mast 38 produces electrical energy which may be used to energize magnetic windings 30, 32 and 34.

The spacecraft of FIG. 1 can be expected to have a residual net magnetic field at the time it enters orbit, as a result of the contributions of many small field-producing components. The net magnetic field has magnitude and direction, and can be represented as a vector. In general, the net residual magnetic field 52 has arbitrary direction, magnitude and plurality as illustrated in FIG. 2.

The magnetic field of the Earth varies from place to place, in a manner which changes with time and conditions. The overall configuration of the Earth's magnetic field, however, is known. As illustrated in FIG. 3, the Earth has North and South (not visible) magnetic poles as indicated generally in FIG. 3. In FIG. 3, the North magnetic pole is indicated as N. The lines of magnetic force 56 extend between North and South poles. When spacecraft 10 of FIG. 1 orbits Earth 54 of FIG. 3, it passes through lines of force 56. The net magnetic dipole represented by magnetic field lines 52 of FIG. 2 interact with magnetic field lines 56 of Earth to produce a torque which tends to change the attitude of the spacecraft. In general, the magnetic torque exerted upon the spacecraft at any point in the orbit may be mathematically represented by the cross product of the magnetic dipole of the spacecraft with the local magnetic field of the Earth. As mentioned, the exact magnitude and direction of the Earth's magnetic field changes from time to time and from point to point, even though it has a well-known overall configuration. For this reason alone, it is not possible to determine the magnetic torque in order to counteract that torque. Furthermore, the equation for magnetic torque at a point has multiple solutions, and the proper value may be difficult or impossible to determine.

In accordance with the invention, the body rate of the spacecraft is measured over a substantial portion of the orbit. Also, the Earth's magnetic flux density over substantial portion of the orbit, as determined by historical information made over a period of time (or by measurements of induction made over the portion of the orbit), and the total momentum of the spacecraft are measured. These measurements, processed and integrated over a substantial portion of the orbit, allow estimation of the net residual magnetic dipole of the spacecraft. Further in accordance with the invention, the net residual dipole is canceled by passing electrical current through coils such as coils 30, 32 and/or 34 of FIG. 1 in a manner which reduces the residual magnetic dipole. The current which flows through coils 30, 32, and 34 may be a direct current of variable amplitude, or may be on-off pulsed in order to achieve the same effects.

Theoretical considerations for estimating the residual magnetic dipole begin with the equation for angular momentum in the body frame;

$$h' + \omega^x h = \mu_r^x B \quad (1)$$

where
bold characters represent vectors;
h is the total momentum in the body frame;
$\omega$ is the body rate;
B is the Earth's magnetic flux density;
$\mu_r$ is the residual spacecraft dipole;
$\omega^x$ is the skew-symmetric matrix $$\begin{bmatrix} 0 & -\omega_z & \omega_y \\ \omega_z & 0 & -\omega_x \\ -\omega_y & \omega_x & 0 \end{bmatrix} \quad (2a)$$

and $\mu_r^x$ is the skew-symmetric matrix $$\begin{bmatrix} 0 & -\mu_{rz} & \mu_{ry} \\ \mu_{rz} & 0 & -\mu_{rx} \\ -\mu_{ry} & \mu_{rx} & 0 \end{bmatrix} \quad (2b)$$

The term on the right side of equation (1) is the torque due to the interaction of the spacecraft's residual magnetic dipole moment with the Earth's magnetic field.

It is not possible to measure the satellite magnetic dipole instantaneously, but the dipole can be estimated by taking the cross-product of equation (1) with B, integrating over a time period $\tau$ representing the time required for a portion of an orbit, and solving for $\mu_r$ $$\mu_r = -\left[ \int_0^\tau B^x B^x dt \right]^{-1} \int_0^\tau B^x(h' + \omega^x h) dt \quad (3)$$

The first matrix integral of equation (3) will be invertible if $\tau$ spans a period over which the magnetic field varies sufficiently, usually one-half to one orbit. The second term includes only the component of momentum change perpendicular to the magnetic field. Components tangent to the magnetic field lines drop out of the integration. If the attitude control system bandwidth is much larger than the bandwidth of the external disturbances, $$h' \cong T_r \quad (4)$$
$$h \cong h_r$$

where $T_r$ is the control torque and $h_r$ is the reaction or momentum wheel momentum. B is obtained from either a magnetic field model or from magnetometer measurements.

Once $\mu_r$ is estimated, the magnetic disturbance torque can be adjusted toward zero by setting the spacecraft control dipole moment equal and opposite in polarity from the nominal value of the residual dipole $$\mu_c = -\mu_r \quad (5)$$

If variable dipole torquers are available this setting can be performed exactly, thus eliminating the residual dipole disturbance torque. If only on-off torquers are available, the following relationship must be satisfied $$\int_0^\tau \mu_c^x B dt = -\int_0^\tau \mu_r^x B dt \quad (6)$$

over the period $\tau$. Residual dipole cancellation with on-off torquers requires knowledge of the magnetic field after the initial calibration, while dipole cancellation with continuous torquers only requires knowledge of the field during the initial residual dipole estimation. If B does not vary significantly over the period $\tau$. (6) reduces to $$\int_0^\tau \mu_c dt = -\int_0^\tau \mu_r dt \quad (7)$$

Control of the magnitude of the current flowing through windings 30, 32 and 34 of FIG. 1 to equal any desired value is well known.

Once the coil current has been set to a value which substantially reduces or eliminates the spacecraft residual magnetic dipole, disturbance torques occasioned by interaction with the Earth's magnetic field will be reduced, regardless of the actual value of the Earth's magnetic field. Since the Earth's magnetic field is never exactly known, especially during magnetic storms, the performance of the attitude control system will be more predictable than without the invention, and will require less operator oversight. This in turn increases the reliability. Furthermore, the reduced magnitude of the disturbance torques when the invention is used reduces the maximum torque requirements, and may allow a cost reduction in the design phase.

Figure 4:
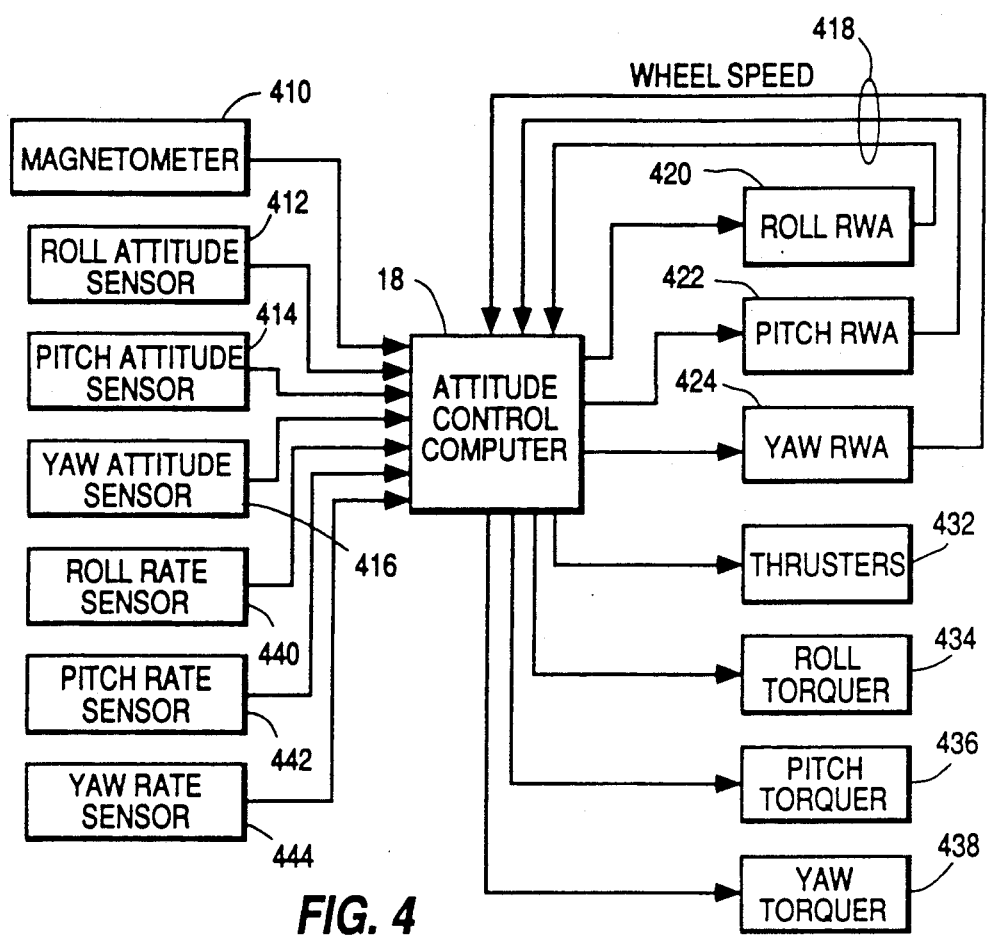
FIG. 4 is a simplified block diagram of an attitude control system for a spacecraft, showing where the signals are generated which may be accessed for forming an estimate according to the invention.

FIG. 4 is a simplified block diagram of an attitude control system for a spacecraft. In FIG. 4, block 18 represents an attitude control computer, further described below, which receives as inputs signals from a magnetometer 410, from roll, pitch and yaw attitude sensors 412, 414 and 416, respectively, from roll rate, pitch rate, and yaw rate sensors 440, 442 and 444, respectively, and which also receives reaction wheel speed data by way of paths illustrated together as 418 from reaction wheel assemblies (RWA) 420, 422 and 424, respectively. RWA 420, 422 and 424 act on wheels 20, 22 and 24 of FIG. 1. Attitude control computer 402 may also receive desired attitude information from antenna 18 of FIG. 1 by a path (not illustrated in FIG. 4), and/or computer 18 may contain a memory which stores the desired attitude. Computer 18 controls RWAs 420, 422 and 424, and also controls thrusters illustrated as a block 432, and roll, pitch and yaw magnetic torquers 434, 436 and 438, respectively, which may cause currents to flow through windings 30, 32 and 34 of FIG. 1.

Figure 5:
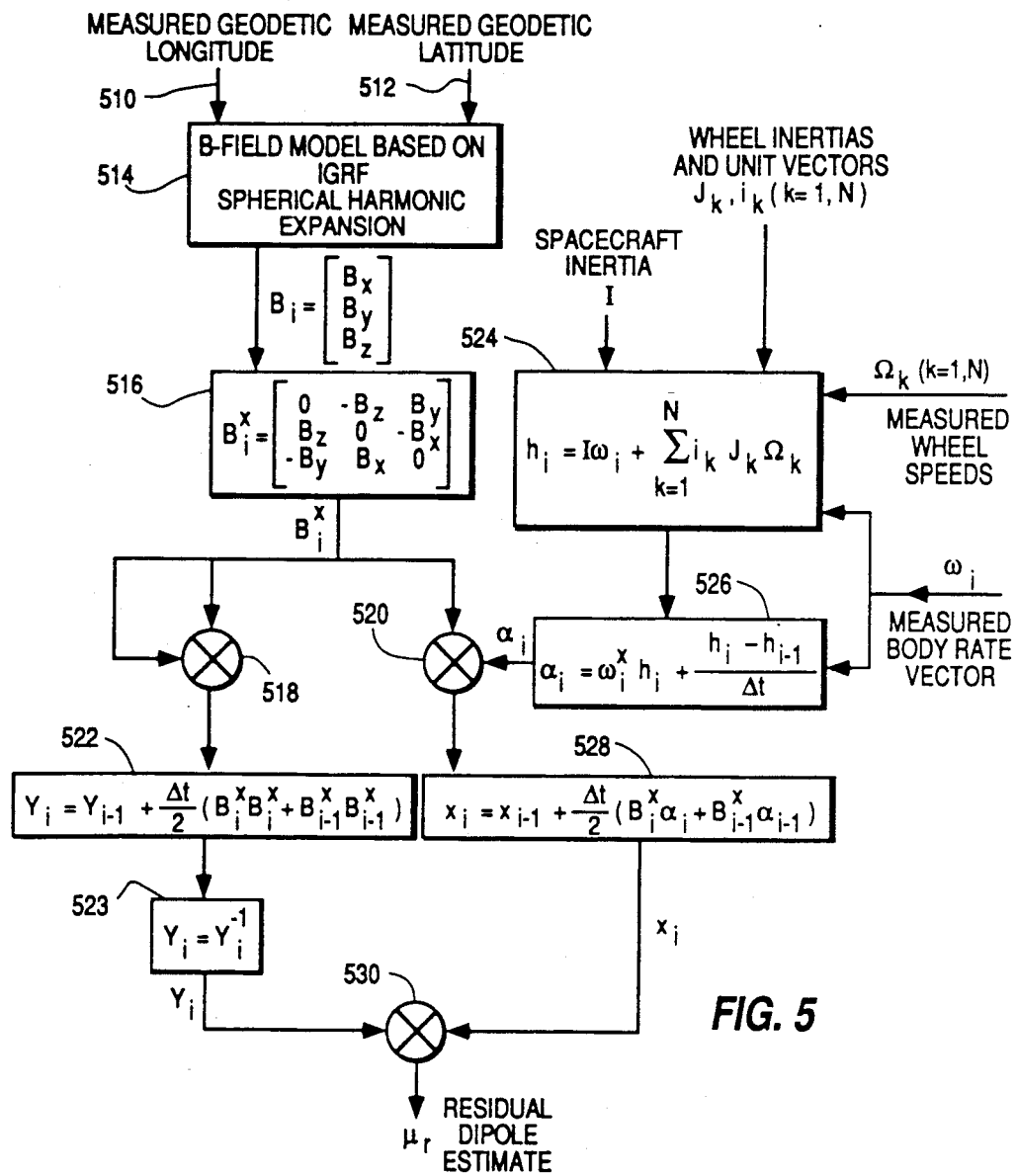
FIG. 5 is a simplified functional block diagram showing the logic flow for generating signals representing an estimate of the components of the magnetic dipole of the spacecraft using memorized average magnetic flux density information.

FIG. 5 is a simplified functional block diagram illustrating the operation of attitude control computer 18 of FIGS. 1 and 4, for a system according to the invention which includes a model of the Earth's magnetic field, and determines the local field recourse to the model, using longitude and latitude information.

In FIG. 5, measured geodetic (i.e. referenced to an oblate Earth) longitude and latitude are applied by way of data paths 510 and 512 to a block 514, which represents a stored model of the Earth's magnetic field based on International Geomagnetic Reference Field (IGRF) spherical harmonic expansion, as described at PP 779-782 of the text "Spacecraft Attitude Determination and Control", by Wertz, published by Reidel. The model represented by block 514, when addressed with local longitude and latitude, produces signals representative of a vector $$B_i = \begin{bmatrix} B_x \\ B_y \\ B_z \end{bmatrix} \quad (8)$$

which is representative of the local magnetic field. The subscript i refers to the current time. The field-representative signals $B_i$ are applied to a further block 516.

Block 516 represents generation of the skew symmetric matrix for index i (at the $i_{th}$ time step)

$$B_i^x = \begin{bmatrix} 0 & -B_z & B_y \\ B_z & 0 & -B_x \\ -B_y & B_x & 0 \end{bmatrix} \quad (9)$$

which is then applied to multipliers 518 and 520. Multiplier 520 multiples $B_i^x$ by itself to produce $$(B^x_i B^x_i) \quad (10)$$

which is a term required for solution of Equation (3), and which is in turn applied to a block 522. Block 522 represents the calculation of the current value of Y, namely $Y_i$, $$Y_i = Y_{i-1} + \frac{\Delta t}{2}(B_i^x B_i^x + B_{i-1}^x B_{i-1}^x) \quad (11)$$

where
Y is the first integral in Equation 3; and
$\Delta t$ is the control system sample period.
The value of $Y_i$ is inverted in a block 523.
Memories (not illustrated) are preprogrammed with values of spacecraft constants, such as spacecraft inertia I and wheel inertias and unit vectors $J_k$, $I_k$ where k varies from 1 to N, the maximum number of wheels. These constants are made available to a block 524, together with the instantaneous wheel speed $\Omega_k$ for the various wheels (k=1,N) and $\omega_i$, the measured body rate vector. Block 524 represents the calculation of net instantaneous momentum $$h_i = I\omega_i + \sum_{k=0}^{N} i_k J_k \Omega_k \quad (12)$$

The net instantaneous momentum is applied to a block 526, representing the calculation of the instantaneous or current value of angular acceleration $\alpha$ $$\alpha_i = \omega_i h_i + \frac{h_i - h_{i-1}}{\Delta t} \quad (13)$$

Multiplier 520 multiplies $\alpha_i$ by $B^x$ to produce $$B_i^x \alpha_i \quad (14)$$

In block 528, the current value of $B_i^x \alpha_i$ is added to its value during the previous sampling interval, $B_{i-1}^x \alpha_{i-1}$, divided by two and multiplied by the sampling period, and further processed to produce $x_i$, which is the integral of the product of the skew symmetric matrix and angular acceleration $$x_i = x_{i-1} + \frac{\Delta t}{2}(B_i^x \alpha_i + B_{i-1}^x \alpha_{i-1}) \quad (15)$$

Finally, the values of $x_i$ from block 528 and $Y_i$ from block 522 are multiplied in a multiplier 530 to produce the residual dipole estimate $\mu_r$.

Naturally, if measured values of $B_i$ are available from a magnetometer system, magnetic field model 514 of FIG. 5 will not be necessary, and measured Bi may be applied to block 516 directly.

Other embodiments of the invention will be apparent to those skilled in the art. For example, a satellite orbiting a heavenly body other than Earth may use the described invention. The technique may be applied independently to widely spaced portions of a spacecraft, such as solar arrays. Magnetic windings may be air-core or magnetic-core, as desired.

What is claimed is:
1. A method for rendering a spacecraft substantially free of perturbations of attitude and position attributable to magnetic fields of a heavenly body about which it orbits, said method comprising the steps of:
measuring the spacecraft momentum over a portion of an orbit of said spacecraft about said heavenly body by the use of electrical instruments, to produce momentum-related electrical signals;
measuring the body rate of said spacecraft over said portion of said orbit by the use of electrical instru- ments, to produce body-rate-related electrical signals;

accessing information from an electronic memory, which information relates to the historic magnitude of the magnetic field of said heavenly body in said portion of said orbit;

estimating the magnitude and direction of the magnetic dipole of said spacecraft by means of a computer, from at least said momentum-related and body-rate-related signals and said accessed information, to form electrical signals representing an estimate of said magnetic dipole; and automatically passing current through coils associated with said spacecraft in response to said electrical signals representing an estimate for tending to cancel said perturbations.

2. A method according to claim 1 wherein said step of estimating includes the step of taking the quotient of integrals of cross products.

3. A method according to claim 2 wherein said quotient of integrals of cross products is $$\mu_r = -\left[\int_0^T B^x B^x dt\right]^{-1} \int_0^T B^x(h' + \omega^x h)dt$$

where:
B represents the magnetic flux density of the heavenly body;
h is the total momentum of the spacecraft in the body frame;
$\omega$ is the body rate; and
$a^x$ represents a skew-symmetric matrix.

4. A method according to claim 2 wherein said step of taking the quotient of integrals of cross products includes the step of generating a skew-symmetric matrix representing the local magnetic field vector $$B_i^x = \begin{bmatrix} 0 & -B_z & B_y \\ B_z & 0 & -B_x \\ -B_y & B_x & 0 \end{bmatrix}$$

5. A method according to claim 4 further comprising the step of multiplying said skew-symmetric matrix by itself to produce $(B^x_i B^x_i)$ 6. A method according to claim 5 further comprising the step of summing the current value of $(B^x_i B^x_i)$ with its calculated value during a previous sampling instant, $B^x_{i-1} B^x_{i-1}$ multiplying by the time interval between sampling interval, and dividing by two, to produce a partial solution $$\frac{\Delta t}{2}(B_i^x B_i^x + B_{i-1}^x B_{i-1}^x)$$

7. A method according to claim 6 further comprising the step of generating the integral $Y_i$, where index i represents the current sampling interval, by summing together said partial solution with a value $Y_{i-1}$, calculated during a previous sampling interval, to produce $$Y_i = Y_{i-1} + \frac{\Delta t}{2}(B_i^x B_i^x + B_{i-1}^x B_{i-1}^x)$$

8. A method according to claim 7 further comprising the step of calculating the net spacecraft momentum $$h_i = I\omega_i + \sum_{k=0}^{N} i_k J_k \Omega_k$$

9. A method according to claim 8 further comprising the step of calculating the current spacecraft angular acceleration $$\alpha_i = \omega_i h_i + \frac{h_i - h_{i-1}}{\Delta t}$$

10. A method according to claim 9 further comprising the step of multiplying said skew-symmetric matrix representing the local magnetic field by said spacecraft angular acceleration to produce $B_i \alpha_i$ 11. A method according to claim 10, further comprising the step of producing $x_i$, the integral of the product of said spacecraft angular acceleration and said skew symmetric matrix representing the local magnetic field $$x_i = x_{i-1} + \frac{\Delta t}{2}(B_i^x \alpha_i + B_{i-1}^x \alpha_{i-1})$$

12. A method according to claim 11, further comprising the step of multiplying together $x_i$ and $Y_i$ to produce an estimate of the spacecraft residual magnetic dipole.

13. A method according to claim 12 further comprising the step of applying current to magnetic windings associated with said spacecraft in a polarity and magnitude calculated to be equal and opposite to said estimate of the spacecraft residual magnetic dipole.

14. A method according to claim 13 wherein said step of applying current comprises the step of applying current pulses having a selected average magnitude.

15. A method according to claim 13 wherein said step of applying current comprises the step of applying at least one direct current having a selected predetermined magnitude to said windings.

* * * * *